United States Patent
Hart et al.

(10) Patent No.: US 10,339,308 B1
(45) Date of Patent: Jul. 2, 2019

(54) SYSTEMS AND METHODS FOR REMEDIATING COMPUTER RELIABILITY ISSUES

(71) Applicant: Symantec Corporation, Mountain View, CA (US)

(72) Inventors: Michael Hart, Farmington, CT (US); Michael Spertus, Chicago, IL (US); William E. Sobel, Jamul, CA (US); Nitin Supekar, Pune (IN)

(73) Assignee: Symantec Corporation, Mountain View, CA (US)

( * ) Notice: Subject to any disclaimer, the term of this patent is extended or adjusted under 35 U.S.C. 154(b) by 340 days.

(21) Appl. No.: 15/347,933

(22) Filed: Nov. 10, 2016

(51) Int. Cl.
  *G06F 21/55* (2013.01)
  *G06F 21/57* (2013.01)
  *G06F 11/00* (2006.01)

(52) U.S. Cl.
  CPC .......... *G06F 21/554* (2013.01); *G06F 11/008* (2013.01); *G06F 21/577* (2013.01); *G06F 2221/034* (2013.01)

(58) Field of Classification Search
  CPC ................. G06F 21/554; G06F 21/577; G06F 2221/034; G06F 11/008
  See application file for complete search history.

(56) References Cited

U.S. PATENT DOCUMENTS

| | | |
|---|---|---|
| 5,774,357 A | 6/1998 | Hoffberg et al. |
| 7,490,073 B1 | 2/2009 | Qureshi et al. |
| 9,235,802 B1 | 1/2016 | Chamness et al. |
| 9,516,053 B1 | 12/2016 | Muddu et al. |
| 2007/0074149 A1 | 3/2007 | Ognev et al. |
| 2011/0040983 A1 | 2/2011 | Grzymala-Busse et al. |
| 2011/0066585 A1* | 3/2011 | Subrahmanyam ..... G06N 7/005 706/52 |
| 2011/0197090 A1 | 8/2011 | Colbert et al. |
| 2011/0314148 A1 | 12/2011 | Petersen et al. |
| 2012/0017232 A1 | 1/2012 | Hoffberg et al. |

(Continued)

OTHER PUBLICATIONS

Event Schema Elements; https://msdn.microsoft.com/en-us/library/windows/desktop/aa384367(v=vs.85).aspx; as accessed Jan. 2, 2017; Aug. 1, 2012.

(Continued)

*Primary Examiner* — Hee K Song
(74) *Attorney, Agent, or Firm* — FisherBroyles, LLP

(57) ABSTRACT

The disclosed computer-implemented method for remediating computer reliability issues may include (1) obtaining a computer-generated log line that potentially includes information pertaining to a cause of a reliability issue experienced by a device, (2) determining that a product-specific schema has not been created for a product that generated the computer-generated log line, (3) in response to determining that a product-specific schema has not been created for the product, matching values of the computer-generated log line to fields within one or more established schemas that are not specific to the product, (4) identifying an entry, within the one or more established schemas, that corresponds to the computer-generated log line, and (5) remediating the device based on information associated with the entry within the one or more established schemas. Various other methods, systems, and computer-readable media are also disclosed.

20 Claims, 7 Drawing Sheets

(56) References Cited

U.S. PATENT DOCUMENTS

| | | |
|---|---|---|
| 2012/0317058 A1 | 12/2012 | Abhulimen |
| 2013/0262082 A1 | 10/2013 | McKeeman et al. |
| 2014/0258528 A1 | 9/2014 | Miller |
| 2014/0259170 A1 | 9/2014 | Amsler |
| 2014/0349269 A1 | 11/2014 | Canoy et al. |
| 2016/0099963 A1 | 4/2016 | Mahaffey et al. |
| 2016/0104076 A1 | 4/2016 | Maheshwari et al. |
| 2016/0218933 A1 | 7/2016 | Porras et al. |
| 2016/0219048 A1 | 7/2016 | Porras et al. |
| 2016/0294606 A1 | 10/2016 | Puri et al. |
| 2016/0299934 A1* | 10/2016 | Karandikar ....... G06F 17/30368 |
| 2017/0063762 A1 | 3/2017 | Machol et al. |
| 2017/0063887 A1 | 3/2017 | Muddu et al. |
| 2017/0242907 A1* | 8/2017 | Goris ................ G06F 17/30598 |
| 2017/0251003 A1* | 8/2017 | Rostami-Hesarsorkh ................... H04L 63/1425 |
| 2017/0339178 A1 | 11/2017 | Mahaffey et al. |
| 2017/0353477 A1 | 12/2017 | Faigon et al. |

OTHER PUBLICATIONS

Log File; https://en.wikipedia.org/wiki/Logfile; as accessed Jan. 2, 2017; Aug. 13, 2013.

Latent Dirichlet Allocation; https://en.wikipedia.org/wiki/Latent_Dirichlet_allocation; as accessed Jan. 2, 2017; Sep. 13, 2006.

Michael Hart et al.; Systems and Methods for Remediating Computer Stability Issues; U.S. Appl. No. 15/266,483, filed Sep. 15, 2016.

\* cited by examiner

SYSTEMS AND METHODS FOR REMEDIATING COMPUTER RELIABILITY ISSUES

BACKGROUND

Security services often rely on log lines to diagnose computer reliability issues. Conventionally, a security service analyzes log lines using product-specific structured schemas. A structured schema may include an entry for each log line generated by a particular product. An entry may include various fields, corresponding to values within a particular log line generated by the product, and information for interpreting the log line. Then, if a computing device is malfunctioning in some way, the security service may identify the log lines generated by an instance of the product running on the computing device and determine to which entry each log line corresponds. Based on the information included in the structured schema for the entries, the security system may diagnose the computing device.

However, in these approaches, in order to derive information about the state of a machine from a particular log line, the particular log line must have been previously analyzed and added to a structured schema. As such, a structured schema created for one product may not be used for other (e.g., newly created) products (i.e., whose log lines vary from the log lines of the product for which the structured schema was created) or even for an updated version of the product for which the structured schema was created. The instant disclosure, therefore, identifies and addresses a need for systems and methods for using log lines generated by products, for which an event schema has not been created, to analyze and remediate computer reliability issues.

SUMMARY

As will be described in greater detail below, the instant disclosure describes various systems and methods for remediating computer reliability issues. In one example, a computer-implemented method for remediating computer reliability issues may include (i) obtaining a computer-generated log line that potentially includes information pertaining to a cause of a reliability issue experienced by a device, (ii) determining that a product-specific schema has not been created for a product that generated the computer-generated log line, (iii) in response to determining that a product-specific schema has not been created for the product, matching values of the computer-generated log line to fields within one or more established schemas that are not specific to the product, (iv) based at least in part on the fields that match the values of the computer-generated log line, identifying an entry, within the one or more established schemas, that corresponds to the computer-generated log line, and (v) remediating the device based on information associated with the entry within the one or more established schemas.

In some examples, matching the values to the fields within the one or more established schemas may include matching the values based on (i) a size of the values, (ii) a format of the values, and/or (iii) the lexical content of the values. Additionally or alternatively, matching a particular value within the computer-generated log line with a particular field may include matching the particular value based at least in part on (i) a value that precedes the particular value, (ii) a value that succeeds the particular value, (iii) a determination that a certain field within the one or more established schemas corresponds to another value within the computer-generated log line, and/or (iv) a determination that a certain field within the one or more established schemas does not correspond to any value within the computer-generated log line.

In some embodiments, the computer-implemented method may further include training a machine learning classifier to identify values within log lines that correspond to schema fields of established schemas and using the machine learning classifier to match the values of the computer-generated log line to the fields within the one or more established schemas. In additional or alternative embodiments, the computer-implemented method may further include identifying a database that includes a list of values that may reside in certain fields included in the one or more established schemas and matching the values of the computer-generated log line to the fields within the one or more established schemas based on information obtained from the database.

In one embodiment, the computer-generated log line may include a novel log line that has not previously been assigned to an entry within the one or more established schemas. In some embodiments, the computer-implemented method may further include (i) identifying an abstract field within the one or more established schemas whose value does not directly correspond to a log line component and (ii) inferring a value of the abstract field for the computer-generated log line based on information collected by analyzing unstructured data included within the computer-generated log line. In one such embodiment, the abstract field may represent a category and/or a severity.

In some examples, inferring the value of the abstract field may include inferring the value of the abstract field based on the values of the computer-generated log line that match the fields within the one or more established schemas. Additionally, inferring the value of the abstract field may include inferring the value of the abstract field based on (i) a size of the computer-generated log line, (ii) content included with the text of the computer-generated log line, (iii) punctuation included within the computer-generated log line, and/or (iv) fields for which no corresponding values are identified in the computer-generated log line.

In one example, the reliability issue may represent a security issue. Additionally or alternatively, the reliability issue may represent a stability issue, a performance issue, and/or a data integrity issue. In one embodiment, the reliability issue may include (i) a decrease in the overall reliability of the device, (ii) a decrease in the reliability of application software installed on the device, and/or (iii) a decrease in the reliability of system software installed on the device. In some examples, identifying the entry that corresponds to the computer-generated log line may include (i) converting the values of the computer-generated log line to a series of text tokens, (ii) converting each text token into a normalized format, (iii) presenting each normalized token to a field value mapper, and (iv) receiving, from the field value mapper, information indicating the fields that match the values of the computer-generated log line.

In one embodiment, the product that generated the computer-generated log line may include a security product running on the device. In one example, the computer-implemented method may further include determining, based on the information associated with the entry, that the reliability issue was likely caused by a malicious event incited by a malicious program. In this example, remediating the device may include performing a computer security action. In one embodiment, the computer security action may include (i) removing the malicious program from the device, (ii) quarantining the malicious program, and/or (iii) transmitting a notification to the device that indicates that the device has been infected with malware.

In one embodiment, a system for implementing the above-described method may include (i) an obtaining module, stored in memory, that obtains a computer-generated log line that potentially includes information pertaining to a cause of a reliability issue experienced by a device, (ii) a determination module, stored in memory, that determines that a product-specific schema has not been created for a product that generated the computer-generated log line, (iii) a matching module, stored in memory, that matches, in response to determining that a product-specific schema has not been created for the product, values of the computer-generated log line to fields within one or more established schemas that are not specific to the product, (iv) an identification module, stored in memory, that identifies, based at least in part on the fields that match the values of the computer-generated log line, an entry, within the one or more established schemas, that corresponds to the computer-generated log line, (v) a remediation module, stored in memory, that remediates the device based on information associated with the entry within the one or more established schemas, and (vi) at least one physical processor configured to execute the obtaining module, the determination module, the matching module, the identification module, and the remediation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) obtain a computer-generated log line that potentially includes information pertaining to a cause of a reliability issue experienced by a device, (ii) determine that a product-specific schema has not been created for a product that generated the computer-generated log line, (iii) match, in response to determining that a product-specific schema has not been created for the product, values of the computer-generated log line to fields within one or more established schemas that are not specific to the product, (iv) identify, based at least in part on the fields that match the values of the computer-generated log line, an entry, within the one or more established schemas, that corresponds to the computer-generated log line, and (v) remediate the device based on information associated with the entry within the one or more established schemas.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
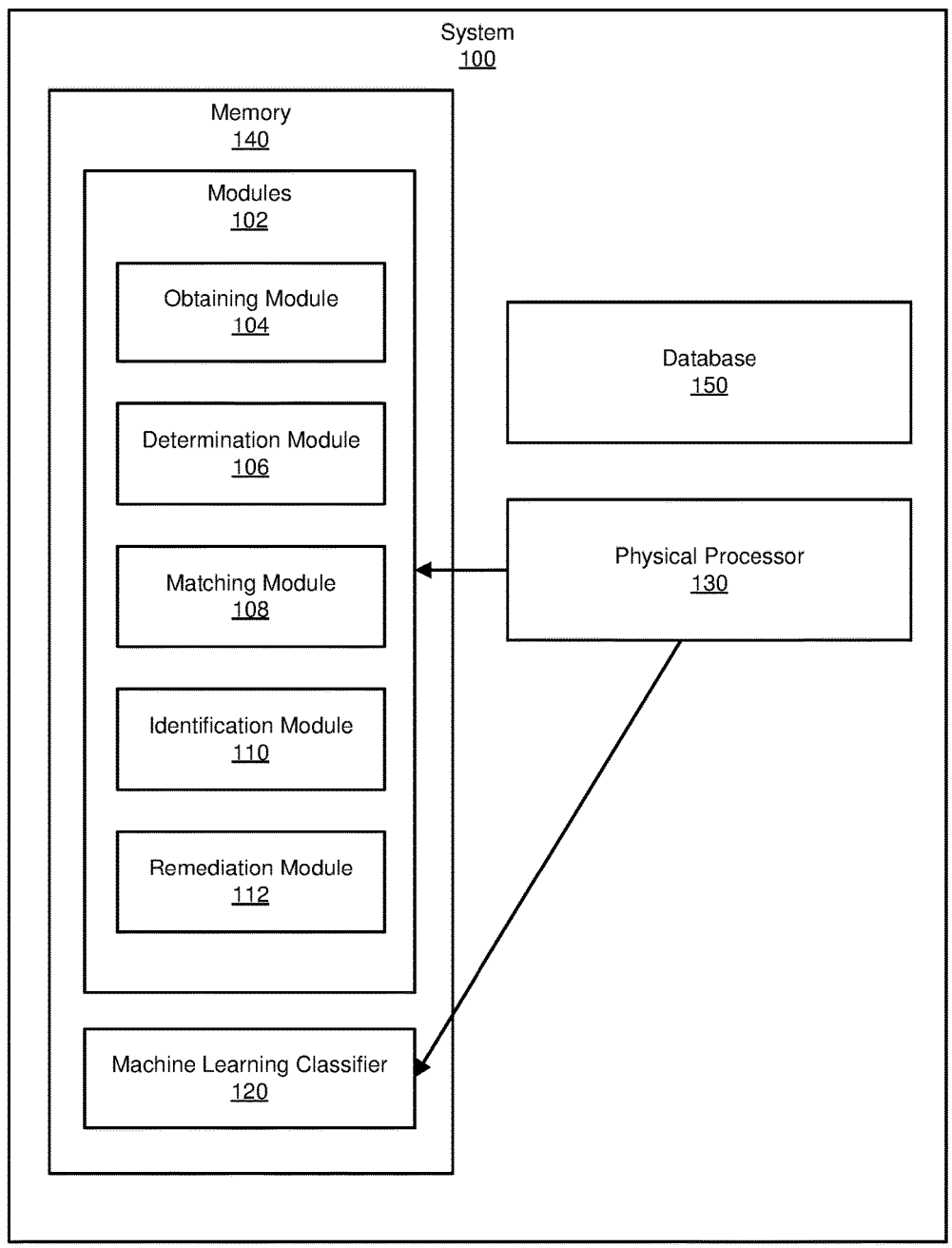
FIG. 1 is a block diagram of an example system for remediating computer reliability issues.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for remediating computer reliability issues. As will be explained in greater detail below, by analyzing log lines for features that are consistent across products (e.g., using machine learning and/or natural language processing techniques), the disclosed systems and methods may match the log lines of products, for which a schema has not been created, to entries in previously established schemas (e.g., schemas created for other products).

By matching the log lines of products for which a schema has not been created to existing schemas, the disclosed systems and methods may take advantage of the wealth of information included in existing schemas without requiring the time and resources that are required to create a new schema. The disclosed systems and methods may improve the functioning of a computing device by using the information obtained from previously established schemas to diagnose and remediate computer reliability issues. These systems and methods may also improve the field of computer diagnostics and incident generation by enabling remediation based on an analysis of novel log lines.

The following will provide, with reference to FIGS. 1-2 and 4-5, detailed descriptions of example systems for remediating computer reliability issues. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for remediating computer reliability issues. As illustrated in this figure, exemplary system 100 may include one or more modules 102 for performing one or more tasks. For example, and as will be explained in greater detail below, exemplary system 100 may include an obtaining module 104 that obtains a computer-generated log line that potentially includes information pertaining to a cause of a reliability issue experienced by a device. Exemplary system 100 may additionally include a determination module 106 that determines that a product-specific schema has not been created for a product that generated the computer-generated log line. Exemplary system 100 may also include a matching module 108 that, in response to determination module 106 determining that a product-specific schema has not been created for the product, matches values of the computer-generated log line to fields within one or more established schemas that are not specific to the product. Exemplary system 100 may additionally include an identification module 110 that, based at least in part on the fields that match the values of the computer-generated log line, identifies an entry, within the one or more established schemas, that corresponds to the computer-generated log line. Exemplary system 100 may also include a remediation module 112 that remediates the device based on information associated with the entry within the one or more established schemas. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate remediating computer reliability issues. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include a machine learning classifier 120. Machine learning classifier 120 generally represents any type or form of data structure capable of matching unstructured data values within log lines to fields within structured schemas. In some examples, machine learning classifier 120 may have been trained on log lines from a product for which a schema had been previously established.

As illustrated in FIG. 1, exemplary system 100 may also include one or more databases, such as database 150. In one example, database 150 may be configured to store a list of products for which a schema has been created. Additionally or alternatively, database 150 may be configured to store a list of products for which a schema has not been created. In some examples, database 150 may include information detailing features of log lines, and/or values within log lines, that are consistent across products. Database 150 may represent portions of a single database or computing device or a plurality of databases or computing devices. For example, database 150 may represent a portion of server 206 in FIG. 2, computing system 610 in FIG. 6, and/or portions of exemplary network architecture 700 in FIG. 7. Alternatively, database 150 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
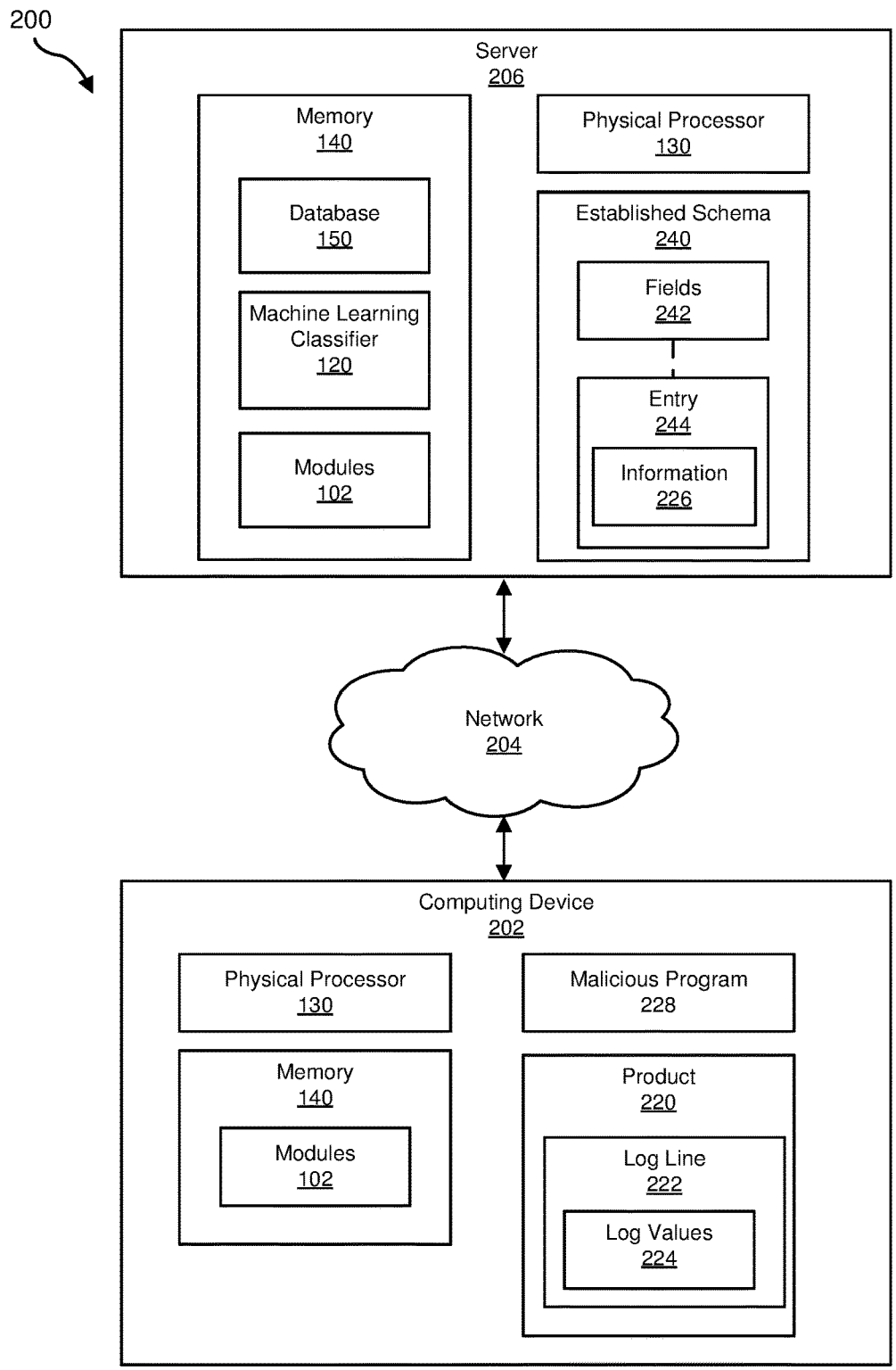
FIG. 2 is a block diagram of an additional example system for remediating computer reliability issues.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to remediate computer reliability issues. For example, and as will be described in greater detail below, obtaining module 104 may obtain, from a computing device 202 that has experienced a reliability issue, a log line 222 that potentially includes information pertaining to a cause of the reliability issue. Determination module 106 may determine that a product-specific schema has not been created for a product 220 that generated log line 222. Matching module 108 may match, in response to determining that a product-specific schema has not been created for product 220, log values 224 of log line 222 to fields 242 within established schema 240. Identification module 110 may identify, based at least in part on the determination that fields 242 match log values 224, an entry 244, within established schema 240, that corresponds to log line 222. Then, remediation module 112 may remediate computing device 202 based on information 226 associated with entry 244 within established schema 240.

Computing device 202 generally represents any type or form of computing device capable of reading computer-executable instructions. In some examples, computing device 202 may represent a client device running client security software provided by a security service managing server 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of maintaining log line schemas, analyzing log lines, and/or remediating computer reliability issues. Examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Product 220 generally represents any type or form of computer program that causes a computing system to perform useful tasks. In some examples, product 220 may represent a security product, such as anti-virus software or a firewall, and perform useful security-related tasks. In some examples, product 220 may operate within computing device 202. Additionally or alternatively, product 220 may operate within a remote device that collects information pertaining to computing device 202. For example, product 220 may execute within a networking device that performs useful tasks for a network of computing device 202. In some examples, product 220 may create and/or maintain log files with log lines, such as log line 222. Log line 222 generally represent any type or form of computer-generated record including log values (e.g., log values 224) that tracks a computer event that occurs within computing device 202.

Malicious program 228 generally represents any type or form of computer executable code (e.g., a sequence of computer-readable instructions) created by a malicious entity for a malicious purpose. In some examples, malicious program 228 may be the cause of a computer reliability problem inflicting computing device 202.

Established schema 240 generally represents any type or form of structured data object that categorizes and provides information relating to log lines of a particular product or products. In some examples, established schema 240 may include a list of entries (e.g., entry 244), each entry representing a known log line generated by the product for which established schema 240 was created. In some examples, the entry for a particular log line may include various fields corresponding to a value explicitly included in the particular log line. Examples of such fields may include, without limitation, a source IP, a destination IP, a timestamp, a hostname, a signature, an event description, etc. In some examples, the entry may also include one or more abstract fields, which may be inferred from the fields that correspond to the values explicitly included in the particular log line. Examples of abstract fields may include, without limitation, a category or a severity.

Figure 3:
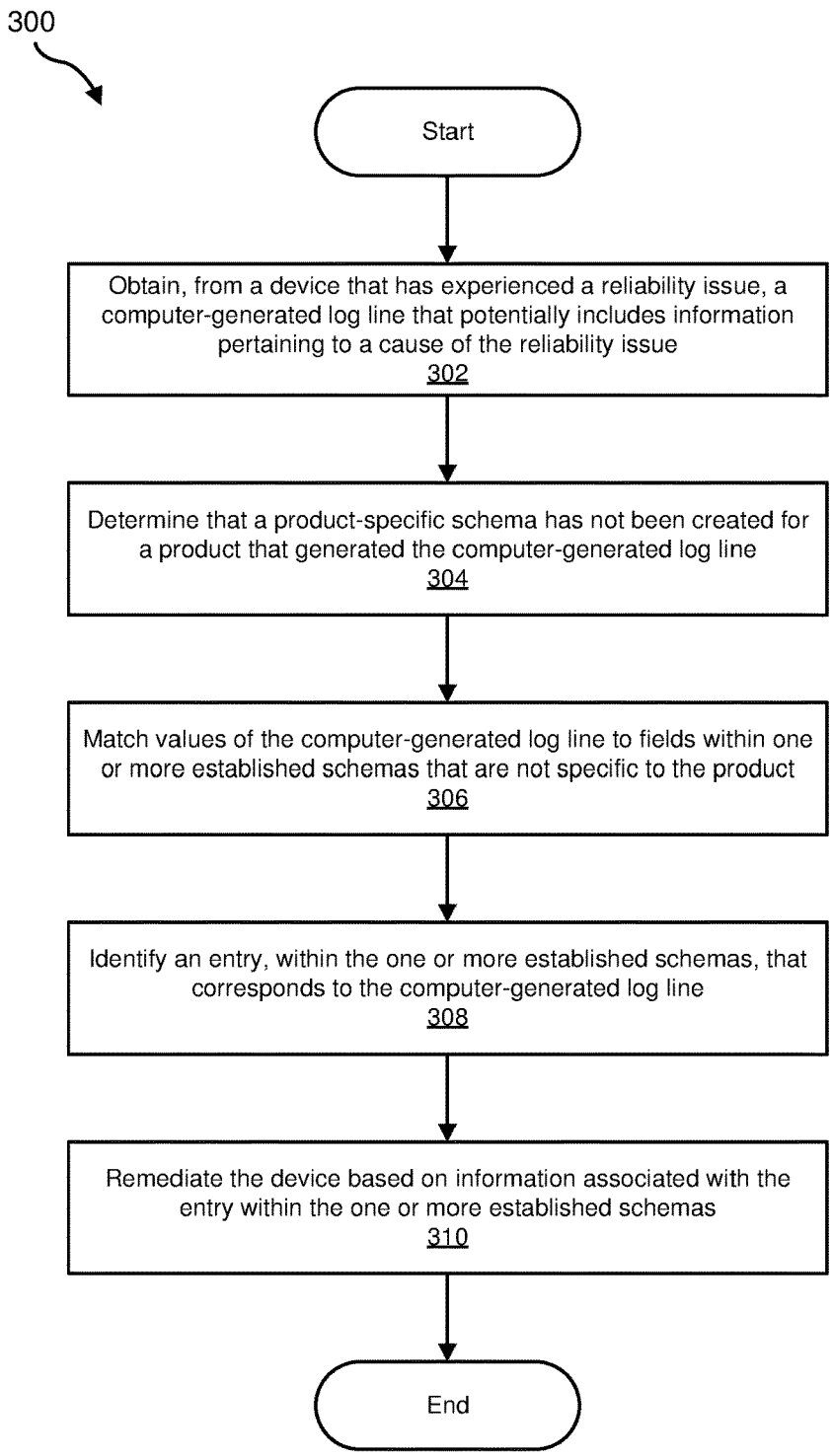
FIG. 3 is a flow diagram of an example method for remediating computer reliability issues.

FIG. 3 is a flow diagram of an example computer-implemented method 300 for remediating computer reliability issues. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may obtain a computer-generated log line that potentially includes information pertaining to a cause of a reliability issue experienced by a device. For example, obtaining module 104 may, as part of server 206 in FIG. 2, obtain log line 222 that potentially includes information pertaining to a cause of a reliability issue experienced by computing device 202. As used herein, the term "reliability" as it relates to a computing device may refer to any aspect of the expected, desired, and/or typical functioning of a computing device. Thus, for example, a computing device may exhibit reliability by operating securely (e.g., without executing unauthorized, illegitimate, and/or malicious operations; without harboring a security vulnerability and/or providing an attack surface; and/or without exposing sensitive data to unauthorized agents), with stability (e.g., executing tasks without error, malfunction, corruption, and/or disruption), with efficiency (e.g., executing tasks in a timely manner, without an overconsumption of computing resources, and/or in line with standard performance objectives), and/or with data integrity (e.g., storing and/or processing data with minimal or no error introduced to the data and/or to output derived from the data). Accordingly, as used herein, the term "reliability issue" refers generally to any type or form of computer issue that poses a threat to the reliability of (e.g., that may negatively impact the security, stability, functioning, performance and/or data integrity of) a computer.

Obtaining module 104 may obtain log line 222 in response to a variety of events. In one embodiment, obtaining module 104 may obtain log line 222 in response to receiving user input. Alternatively, obtaining module 104 may obtain log line 222 automatically. For example, obtaining module 104 may automatically obtain log line 222 in response to determining that computing device 202 has experienced a computer reliability issue.

Obtaining module 104 may determine that computing device 202 has experienced a computer reliability issue in a variety of ways. In some examples, obtaining module 104 may determine that computing device 202 has experienced a decrease in the overall reliability of the device. Additionally or alternatively, obtaining module 104 may determine that computing device 202 has experienced a decrease in the reliability of application software installed on the device and/or a decrease in the reliability of system software installed on the device.

In some examples, as discussed above, the reliability issue may represent a security issue. In one such example, obtaining module 104 may operate as part of a security product that manages the security of computing device 202 or may receive computer security information from the security product. In this example, the security product may determine that computing device 202 has experienced a computer security problem based on routine activity-monitoring. Additionally or alternatively, the security product may determine that computing device 202 has experienced a computer security problem based on the results of a malware scan. In some examples, the security product may determine that computing device 202 is exposed to a security vulnerability.

In some examples, as discussed above, the reliability issue may represent a stability and/or performance issue. In these examples, obtaining module 104 may detect the computer reliability issue based on a variety of computer symptoms.

For example, computing device 202 may have experienced a slowdown, unwanted pop-ups, and/or a crash. Additionally or alternatively, computing device 202 may have experienced suspicious hard drive activity, such as unexpectedly running out of hard drive space. In one embodiment, computing device 202 may have experienced unusually high network activity, received unusual messages, and/or experienced unwanted configuration changes.

In some examples, obtaining module 104 may (in addition or as an alternative to determining that computing device 202 as a whole is experiencing a computer reliability problem) determine that a specific entity associated with computing device 202 is experiencing the computer reliability problem. For example, obtaining module 104 may determine that a computer reliability problem is being experienced by a user account of a particular user logged into computing device 202, an IP address associated with computing device 202, and/or any other entity for which computing device 202 and/or a security product running on computing device 202 may be capable of aggregating log entries.

Obtaining module 104 may obtain log line 222 in a variety of ways. In some examples, obtaining module 104 may obtain log line 222 from a program that generated and/or maintains log line 222. For example, obtaining module 104 may obtain log line 222 from product 220. In examples in which the computer reliability problem was experienced by an entity associated with computing device 202 (e.g., a user account, an IP address, etc.), obtaining module 104 may obtain log line 222 from a program that aggregates log lines for that particular entity's activities on computing device 202.

In some examples, obtaining module 104 may obtain log line 222 from a product running on computing device 202. Additionally or alternatively, obtaining module 104 may obtain log line 222 from a product monitoring computing device 202 (e.g. a firewall). In some examples, log line 222 may include information that is specific to computing device 202. In additional or alternative examples, log line 222 may include network information relating to a network to which computing device 202 belongs that is pertinent to the reliability of computing device 202. In some examples, obtaining module 104 may obtain log line 222 from the device (e.g., log line 222 may be stored by and/or at the device). Additionally or alternatively, obtaining module 104 may obtain log line 222 from another device (e.g., log line 222 may be stored by and/or at another device).

In one embodiment, obtaining module 104 may obtain log line 222 by searching computing device 202 for log lines that may be relevant to the computer reliability issue (e.g., by scanning folders of computing device 202 for such log lines). In some examples, obtaining module 104 may search for log lines that were created during a certain time period relating to the time during which computing device 202 experienced the computer reliability issue in order to build up a set of log lines that represent the relevant activity responsible for the computer reliability issue. In additional examples, obtaining module 104 may further refine the search to identify log lines corresponding to an entity associated with computing device 202 that experienced the computer reliability issue.

At step 304, one or more of the systems described herein may determine that a product-specific schema has not been created for a product that generated the computer-generated log line. For example, determination module 106 may, as part of server 206 in FIG. 2, determine that a product-specific schema has not been created for product 220.

Determination module 106 may determine that a product-specific schema has not been created for product 220 in a variety of ways. In some embodiments, determination module 106 may query a database, such as database 150. In one such example, database 150 may represent a database of product-specific schemas that includes a list of products for which a schema has been established. In this example, determination module 106 may determine that a product-specific schema has not been created for product 220 by determining that product 220 is not included in the list of products.

In another example, database 150 may include a list of products for which no schema has been established. In this example, determination module 106 may determine that a product specific schema has not been established for product 220 by determining that database 150 includes an entry for product 220.

In some examples, determination module 106 may determine that a schema has been created for product 220, but that a schema has not been created for a particular version of product 220 running on computing device 202. In these examples, product 220 may have been updated to the version running on computing device 202, but a schema previously established for product 220 may not have been updated to include entries for the log lines generated by the updated version of product 220.

At step 306, one or more of the systems described herein may, in response to determining that a product-specific schema has not been created for the product, match values of the computer-generated log line to fields within one or more established schemas that are not specific to the product. For example, matching module 108 may, as part of server 206 in FIG. 2 and in response to determining that a product-specific schema has not been created for product 220, match log values 224 of log line 222 to fields 242 within established schema 240 that is not specific to product 220.

Matching module 108 may match log values 224 to fields 242 in a variety of ways. In some examples, matching module 108 may match a particular log value within log values 224 to one of the fields within fields 242 based on a characteristic of the particular log value. For example, matching module 108 may match the particular log value based on a size of the particular log value, the format of the particular log value, and/or lexical content of the particular log value. To give a specific example, matching module 108 may determine that a log line value that follows the pattern "first-name_last-name_MACBOOKPRO" corresponds to a hostname field.

In an additional example, matching module 108 may match a particular log value based, at least in part, on a context of the log value. For example, matching module 108 may match the particular log value based on which fields have been identified as corresponding to other values within log line 222. To give a specific example, matching module 108 may rely on a policy that indicates that certain fields within a schema may often be found together, meaning that a schema entry that includes one of the certain fields will often or always include the other certain field. Similarly, matching module 108 may rely on a policy that indicates that certain fields within a schema may be mutually exclusive, meaning that a schema entry may include at most one of two mutually exclusive fields, but not both.

In one example, matching module 108 may match the particular log value based on information deduced about a value that precedes the particular value and/or a value that succeeds the particular value. Similarly, matching module 108 may match the particular log value based on information deduced about a log line that precedes or succeeds log line 222. In some examples, matching module 108 may match the particular log value based on fields for which no corresponding value within log line 222 has been identified.

In some embodiments, matching module 108 may rely on a machine learning classifier, such as machine learning classifier 120, to identify values within log values 224 that correspond to fields within fields 242. In these examples, machine learning classifier 120 may have been trained on log lines from products for which a schema has been established. In one example, matching module 108 may match log values 224 using a recurrent character based neural network.

In additional or alternative embodiments, matching module 108 may identify values within log values 224 that correspond to fields within fields 242 using a log line dictionary. In these embodiments, matching module 108 may query a database that includes a list of values that may reside in certain schema fields. If a particular value within log values 224 matches one of the values within the list of values, matching module 108 may determine that the particular value corresponds to a field associated with the matching value in the list of values.

Figure 4:
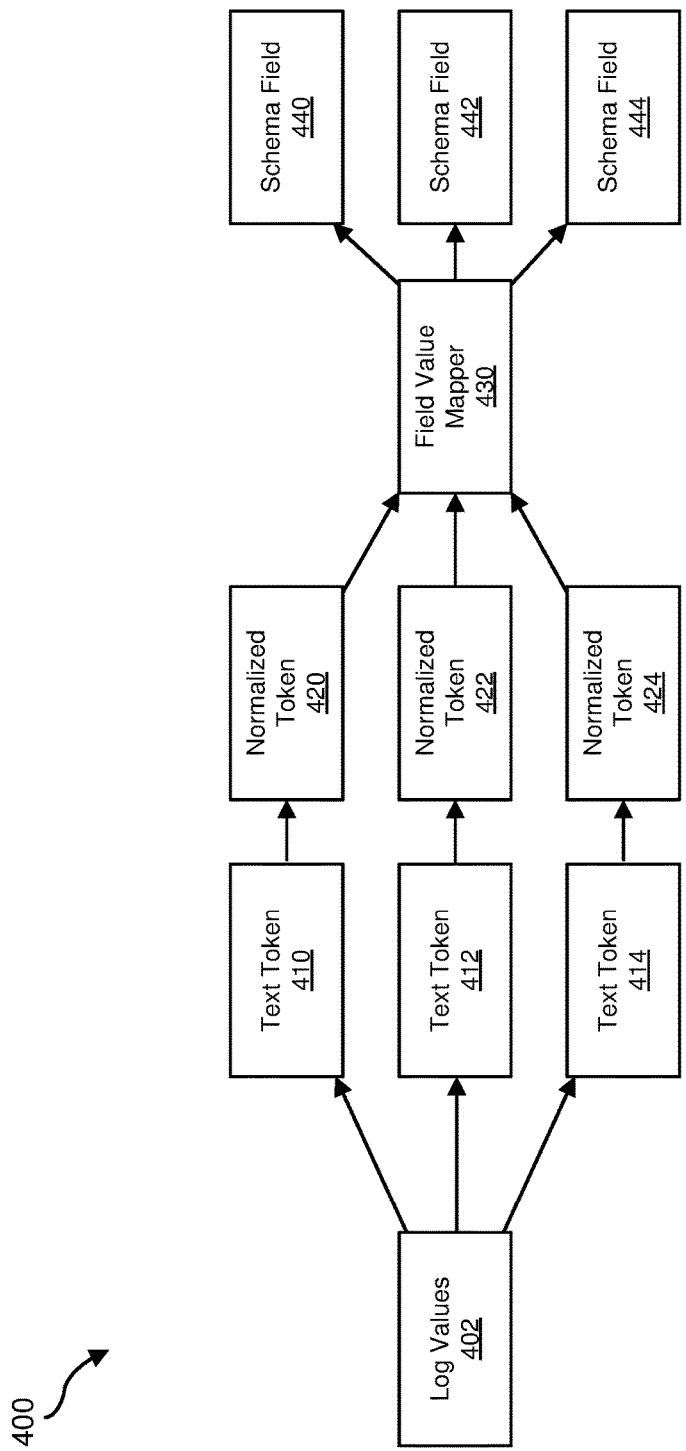
FIG. 4 is a block diagram of an example computing system for matching log values to fields using a field value mapper.

In some examples, matching module 108 may match log values 224 using a field value mapper, as illustrated in system 400 in FIG. 4. As used herein, the term "field value mapper" generally refers to any type or form of classifier that assigns fields to log values using normalized tokens as input. In these examples, matching module may, upon receiving log values 402 in FIG. 4, convert log values 402 into a series of text tokens (i.e., text token 410, text token 412, and text token 414). In some examples, a text token may represent a word, a punctuation, and/or a grouping of words and/or punctuations.

Then, matching module 108 may convert each text token into a normalized token. For example, matching module 108 may normalize a formatting of each text token (e.g. a format that is all lowercase) or map the text tokens into a certain class (e.g. mapping a text token "1234" to a "DIGIT" class). After normalizing each text token, matching module 108 may present each normalized token (i.e., normalized token 420, normalized token 422, and normalized token 424) to a field value mapper 430. Field value mapper 430 may analyze the normalized tokens (e.g., based on each token's content and context). Then, matching module 108 may receive, from field value mapper 430, information indicating schema fields correspond to log values 402 (i.e., schema field 440, schema field 442, and schema field 444).

Returning to FIG. 3, at step 308, one or more of the systems described herein may, based at least in part on the fields that match the values of the computer-generated log line, identify an entry within the one or more established schemas that corresponds to the computer-generated log line. For example, identification module 110 may, as part of server 206 in FIG. 2, based at least in part on fields 242 that match log values 224 of log line 222, identify entry 244 within established schema 240.

Identification module 110 may identify entry 244 in a variety of ways. In some examples, identification module 110 may identify entry 244 based on information obtained by matching module 108. For example, identification module 110 may determine that matching module 108 has matched more than a predetermined number and/or percentage of fields 242 corresponding to entry 244 with one of log values 224. In these examples, identification module 110 may identify entry 244 based on the determination that more than a predetermined number and/or percentage of fields 242 correspond to one of log values 224 within log line 222. In some examples, entry 244 may be identified even though not every value within log values 224 has been matched to a field within fields 242.

In some examples, identification module 110 may identify patterns in the information collected by matching module 108. For example, identification module 110 may identify (i) a certain combination of values, (ii) an order of the values, and/or (iii) values that are not present in log line 222. In these examples, identification module 110 may identify entry 244 based on a policy that indicates that the identified patterns are indicative of entry 244.

In some embodiments, identification module 110 may also identify an abstract field associated with entry 244. As used herein, the term "abstract field" generally refers to any type or form of schema field whose value is not directly (e.g., explicitly) indicated in a log line. Examples of abstract fields may include, without limitation, a category or a severity. In these embodiments, identification module 110 may infer a value of the abstract field for log line 222.

Figure 5:
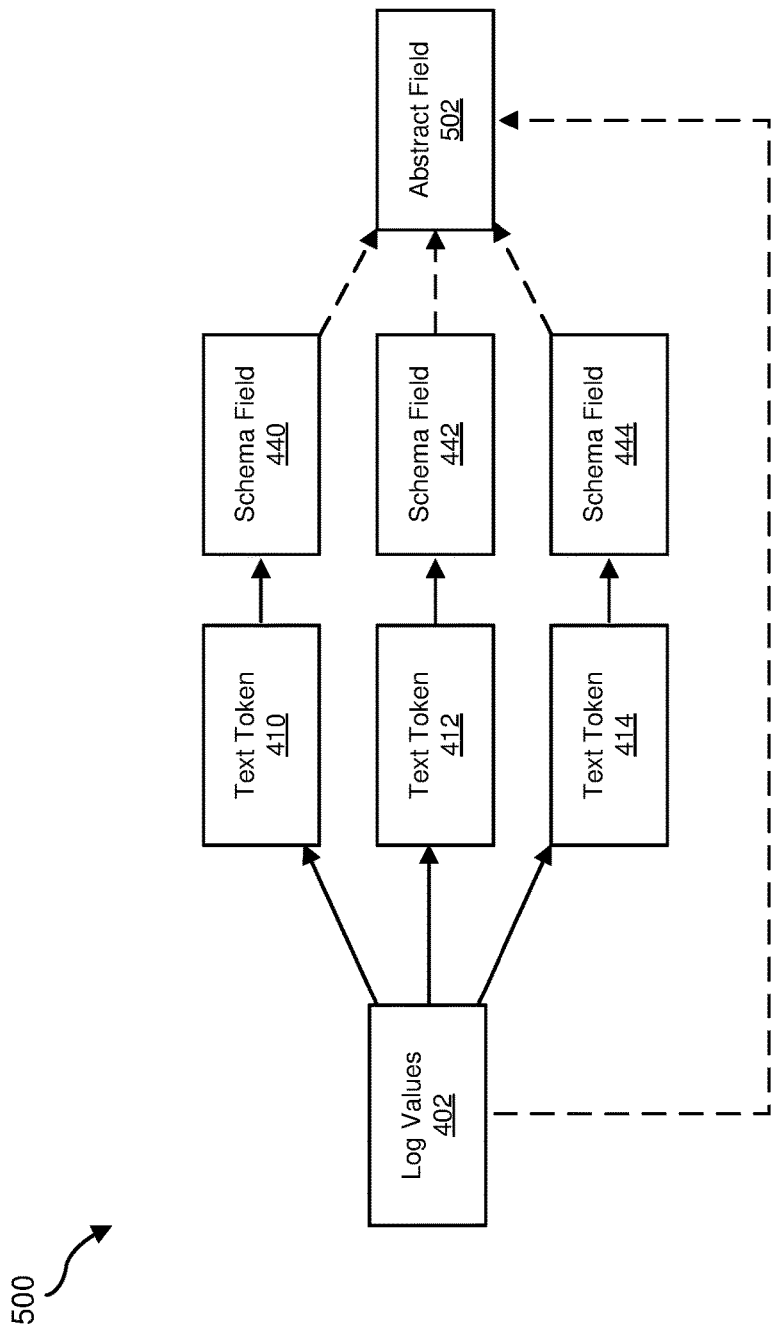
FIG. 5 is a block diagram of an example computing system for inferring abstract fields from log values.

FIG. 5 illustrates an example system 500 for identifying an abstract field 502 for log line 222 based on log values 402 introduced in connection with FIG. 4. Identification module 110 may infer the value of abstract field 502 in a variety of ways. In some examples, identification module 110 may infer the value of abstract field 502 based on the content of log values 402. For example, identification module 110 may infer a category of log line 222 based on the lexical content of log values 402. In one embodiment, identification module 110 may infer the value of abstract field 502 based on the fields within established schema 240 for which there is a corresponding value within log line 222 (e.g., based on schema field 440, 442, and 444). Additionally, identification module 110 may infer the value of abstract field 502 based on the fields within established schema 240 for which there is no corresponding value within log line 222. For example, matching module 108 may (1) determine that log line 222 is not a network event if there is no value corresponding to a destination IP in log line 222 and (2) determine a category of log line 222 based, at least in part, on the determination.

In some embodiments, identification module 110 may infer the value of abstract field 502 based on a size of log line 222. For example, identification module 110 may determine that shorter log lines (e.g., log lines with fewer than a certain number of characters) are more severe than longer log lines. In one example, identification module 110 may infer the value of abstract field 502 based on punctuation included within log line 222. To give a specific example, identification module 110 may determine that an exclamation mark included within log line 222 is an indicator of severity.

As illustrated by FIG. 5, in some examples, identification module 110 may first identify a series of non-abstract fields for which there is a 1:1 correspondence in log line 222 (e.g., schema field 440, schema field 442, and schema field 444) and then, based at least in part on the values of the identified non-abstract fields, identify a value for abstract fields for which there is no 1:1 correspondence.

Returning to FIG. 3, at step 310, one or more of the systems described herein may remediate the device based on information associated with the entry within the one or more established schemas. For example, remediation module 112 may, as part of server 206 in FIG. 2, remediate computing device 202 based on information 226 associated with entry 244 within established schema 240.

Remediation module 112 may remediate computing device 202 in a variety of ways. For example, remediation module 112 may remediate computing device 202 based on information 226 obtained from entry 244. In some examples, this information may indicate that the reliability issue was likely caused by a malicious event incited by malicious program 228. For example, information 226 may indicate that log lines corresponding to entry 244 convey that a behavior that is often indicative of malware (e.g., code injection, shared library creation or modification, registry entry creation of modification, kernel component installation of modification, etc.) has been detected on computing device 202.

In these examples, remediation module 112 may remediate computing device 202 by performing a security action. In one embodiment, the security action may include removing malicious program 228 from computing device 202 or quarantining malicious program 228. Additionally or alternatively, the security action may include blacklisting the malicious event, or blacklisting malicious program 228. In some such examples, the security action may include transmitting a security notification to computing device 202 and/or to an additional computing device (e.g., a security event incident manager).

As described above, the disclosed systems and methods may facilitate converting unstructured data (e.g., unstructured log line data) to structured data (e.g., data that fits into a schema) in real time. By converting unstructured data to structured data in real time, the disclosed systems and methods may take advantage of the intricate and sophisticated analytics that may be run on structured data such that the continuity of such analytics is preserved for unstructured (e.g., new) data.

In some examples, the disclosed systems and methods may infer the components of an unstructured log line by, first, learning from previously parsed data which values typically reside in various schema fields. In one example, the disclosed systems and methods may have created a dictionary of lexical values. In some examples, the dictionary may be specific to an organization. To give a specific example, the dictionary may indicate that a log line component that follows the pattern "first-name_last-name_MACBOOK-PRO" corresponds to a hostname field. Additionally or alternatively, the disclosed systems and methods may have trained a machine learning classifier to detect that a certain lexical entity belongs to a certain field. In one example, the disclosed systems and methods may have trained a recurrent character based neural network to predict the values of fields.

Upon receiving an unstructured log line, the disclosed systems and methods may tokenize and normalize the log line. In one example, a tokenizer may take the text of the log line and convert the text into a sequence of text tokens (e.g. words, punctuation, etc.). These text tokens may be fed into a normalizer. The normalizer may convert the text tokens into a normalized format (e.g. a format that is all lowercase) or map the text tokens into a certain class (e.g. mapping a text token "1234" to a "DIGIT" class). In some examples, a single value within a log line may be broken down into multiple normalized tokens.

Then, the disclosed systems and methods may present the normalized tokens to a field value mapper. The field value mapper may analyze each normalized token to tag each normalized token, taking various constraints into account. In some embodiments, the field value mapper may leverage information from the lexical dictionaries and/or utilize the machine learning classifier discussed above. In some examples, the field value mapper may take the context of each normalized token into account. For example, the field value mapper may take into account each token's previous tokens and next tokens. In one example, certain fields within a schema may be mutually exclusive, meaning that a schema entry may include at most one of two mutually exclusive fields, never both. Thus, if the field value mapper has identified one of the mutually exclusive fields in the sequence of normalized tokens, the field value mapper may rule out the other mutually exclusive field as a possible corresponding field for the other normalized tokens within the sequence.

In another example, certain fields within a schema may often be found together, meaning that a schema entry that includes one of the certain fields will often or always include the other certain fields. Thus, if the field value mapper has identified one of the certain fields in the sequence of normalized tokens, the field value mapper may determine that the other certain fields may correspond to other normalized tokens within the sequence. In some examples, the field value mapper may assign a probability and/or likelihood that a particular token or text would appear in a particular field and map the normalized tokens into the values of a schema based on the assigned probabilities.

After identifying the fields that correspond to the normalized tokens, the disclosed systems and methods may infer values for fields that are not explicated in the text (e.g., severity and category fields). This inference may be based on a variety of inputs, including (without limitation), fields that were successfully identified in the log line, the values of such fields, the normalized tokens, the lexical content of a log line, etc.

Figure 6:
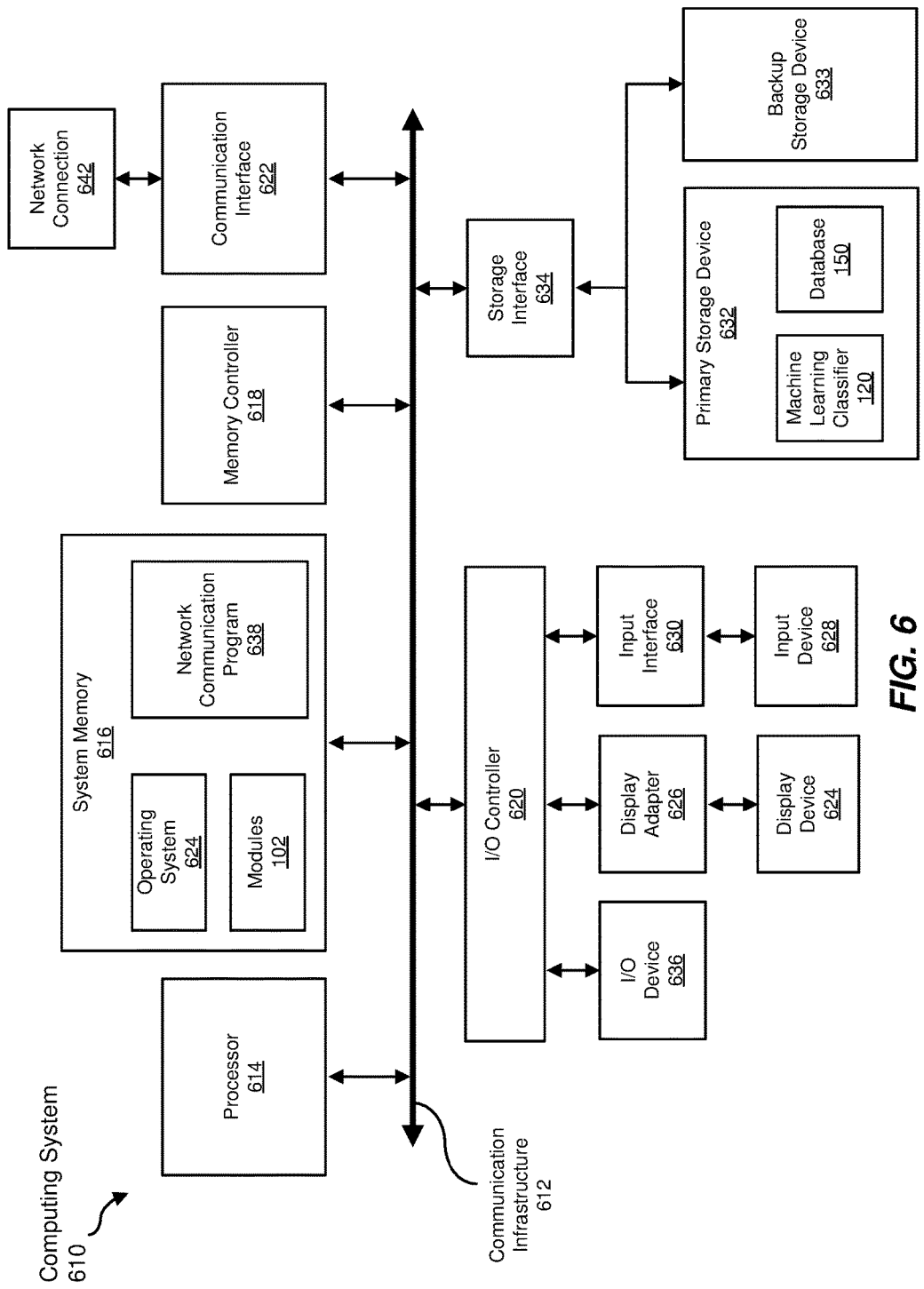
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616)

and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, machine learning classifier 120 and/or database 150 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
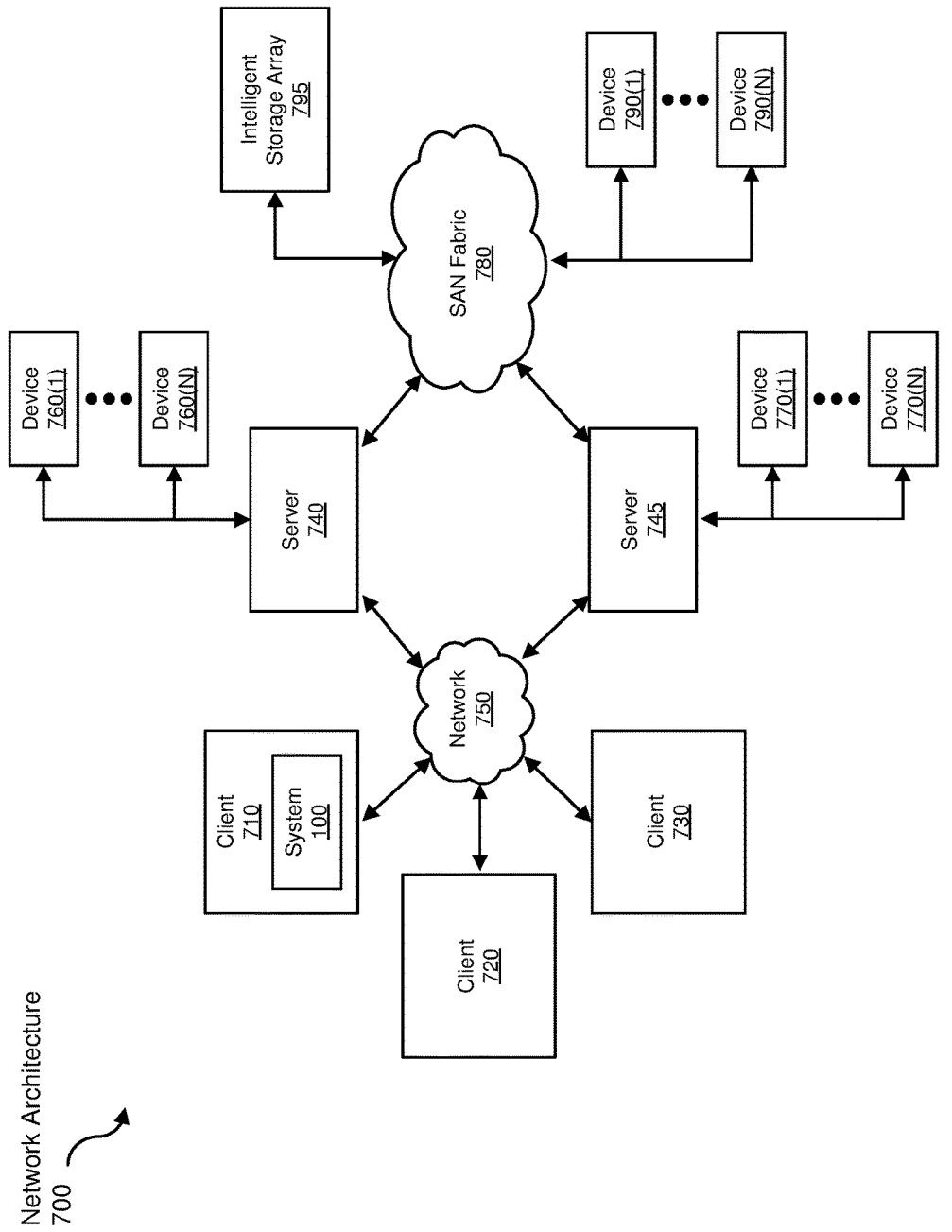
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for remediating computer reliability issues.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive unstructured data and transform the unstructured data into structured data. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for remediating computer reliability issues, at least a portion of the method being performed by a computing device comprising at least one processor, the method comprising:
   obtaining a computer-generated log line that potentially includes information pertaining to a cause of a reliability issue experienced by a device;
   determining that a product-specific schema has not been created for a product that generated the computer-generated log line;
   in response to determining that a product-specific schema has not been created for the product, matching values of the computer-generated log line to fields within one or more established schemas that are not specific to the product;
   based at least in part on the fields that match the values of the computer-generated log line, identifying an entry, within the one or more established schemas, that corresponds to the computer-generated log line; and
   remediating the device based on information associated with the entry within the one or more established schemas.

2. The computer-implemented method of claim 1, wherein matching the values of the computer-generated log line to the fields within the one or more established schemas comprises matching the values based on at least one of:
   a size of the values;
   a format of the values; and
   lexical content of the values.

3. The computer-implemented method of claim 1, wherein matching a particular value of the computer-generated log line with a particular field within the one or more established schemas comprises matching the particular value based on at least one of:
   a value that precedes the particular value in the computer-generated log line;
   a value that succeeds the particular value in the computer-generated log line;
   a determination that a certain field within the one or more established schemas corresponds to another value within the computer-generated log line; and
   a determination that a certain field within the one or more established schemas does not correspond to any value within the computer-generated log line.

4. The computer-implemented method of claim 1, further comprising:
   training a machine learning classifier to identify values within log lines that correspond to schema fields of established schemas; and
   using the machine learning classifier to match the values of the computer-generated log line to the fields within the one or more established schemas.

5. The computer-implemented method of claim 1, further comprising:
   identifying a database that includes a list of values that may correspond to certain fields included in the one or more established schemas; and
   matching the values of the computer-generated log line to the fields within the one or more established schemas based at least in part on information obtained from the database.

6. The computer-implemented method of claim 1, wherein the computer-generated log line comprises a novel log line that has not previously been assigned to an entry within the one or more established schemas.

7. The computer-implemented method of claim 1, further comprising:
   identifying an abstract field within the one or more established schemas whose value does not directly correspond to a log line component; and
   inferring a value of the abstract field for the computer-generated log line based on information collected by analyzing unstructured data included within the computer-generated log line.

8. The computer-implemented method of claim 7, wherein the abstract field comprises at least one of:
   a category; and
   a severity.

9. The computer-implemented method of claim 7, wherein inferring the value of the abstract field comprises inferring the value of the abstract field based on the values of the computer-generated log line that match the fields within the one or more established schemas.

10. The computer-implemented method of claim 9, wherein inferring the value of the abstract field comprises inferring the value of the abstract field based additionally on at least one of:
   a size of the computer-generated log line;
   content included with text of the computer-generated log line;
   punctuation included within the computer-generated log line; and
   fields for which no corresponding values are identified in the computer-generated log line.

11. The computer-implemented method of claim 1, wherein the reliability issue comprises a security issue that impacts the security of the device.

12. The computer-implemented method of claim 1, wherein the reliability issue comprises a stability issue that impacts the stability of the device.

13. The computer-implemented method of claim 1, wherein the reliability issue comprises at least one of:
   a performance issue affecting the performance of the device; and
   a data integrity issue.

14. The computer-implemented method of claim 1, wherein the reliability issue comprises at least one of:
   a decrease in the overall reliability of the device;
   a decrease in the reliability of application software installed on the device; and
   a decrease in the reliability of system software installed on the device.

15. The computer-implemented method of claim 1, wherein identifying the entry that corresponds to the computer-generated log line comprises:
   converting the values of the computer-generated log line to a series of text tokens;
   converting each text token into a normalized format;
   presenting each normalized token to a field value mapper; and
   receiving, from the field value mapper, information indicating the fields that match the values of the computer-generated log line.

16. The computer-implemented method of claim 1, wherein the product that generated the computer-generated log line comprises a security product running on the device.

17. The computer-implemented method of claim 1, wherein:
   the method further comprises determining, based on the information associated with the entry, that the reliability issue was likely caused by a malicious event incited by a malicious program; and
   remediating the device comprises performing a computer security action.

18. The computer-implemented method of claim 17, wherein the computer security action comprises at least one of:
   removing the malicious program from the device;
   quarantining the malicious program; and
   transmitting a notification to the device that indicates that the device has been infected with malware.

19. A system for remediating computer reliability issues, the system comprising:
   an obtaining module, stored in memory, that obtains a computer-generated log line that potentially includes information pertaining to a cause of a reliability issue experienced by a device;
   a determination module, stored in memory, that determines that a product-specific schema has not been created for a product that generated the computer-generated log line;
   a matching module, stored in memory, that, in response to the determination module determining that a product-specific schema has not been created for the product, matches values of the computer-generated log line to fields within one or more established schemas that are not specific to the product;
   an identification module, stored in memory, that, based at least in part on the fields that match the values of the computer-generated log line, identifies an entry, within the one or more established schemas, that corresponds to the computer-generated log line;
   a remediation module, stored in memory, that remediates the device based on information associated with the entry within the one or more established schemas; and
   at least one physical processor configured to execute the obtaining module, the determination module, the matching module, the identification module, and the remediation module.

20. A non-transitory computer-readable medium comprising one or more computer-readable instructions that, when executed by at least one processor of a computing device, cause the computing device to:
   obtain a computer-generated log line that potentially includes information pertaining to a cause of a reliability issue experienced by a device;
   determine that a product-specific schema has not been created for a product that generated the computer-generated log line;
   in response to the determination that a product-specific schema has not been created for the product, match values of the computer-generated log line to fields within one or more established schemas that are not specific to the product;
   based at least in part on the fields that match the values of the computer-generated log line, identify an entry, within the one or more established schemas, that corresponds to the computer-generated log line; and
   remediate the device based on information associated with the entry within the one or more established schemas.

* * * * *